United States Patent
Mackenzie

(10) Patent No.: US 12,510,015 B2
(45) Date of Patent: Dec. 30, 2025

(54) PISTON BEARING ASSEMBLY FOR AN OPPOSED-PISTON ENGINE

(71) Applicant: General Atomics Aeronautical Systems, Inc., San Diego, CA (US)

(72) Inventor: Ryan G. Mackenzie, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 1892 days.

(21) Appl. No.: 15/924,015

(22) Filed: Mar. 16, 2018

(65) Prior Publication Data
US 2018/0202346 A1    Jul. 19, 2018

Related U.S. Application Data

(63) Continuation-in-part of application No. 15/687,368, filed on Aug. 25, 2017, which is a continuation of
(Continued)

(51) Int. Cl.
*F01P 3/10* (2006.01)
*F01B 7/02* (2006.01)
(Continued)

(52) U.S. Cl.
CPC ............... *F01P 3/10* (2013.01); *F01B 7/02* (2013.01); *F01B 7/14* (2013.01); *F02B 23/06* (2013.01);
(Continued)

(58) Field of Classification Search
CPC ....... F01P 3/10; F01B 7/02; F01B 7/14; F01B 23/06; F16J 1/18
(Continued)

(56) References Cited

U.S. PATENT DOCUMENTS 3,221,718 A   12/1965 Isley
3,703,126 A   11/1972 Haug
(Continued)

FOREIGN PATENT DOCUMENTS

DE       3702272 A1   10/1987
DE   102011007285 A1   10/2012
(Continued)

OTHER PUBLICATIONS

Sammons, et al., "Napier Nomad Aircraft Diesel Engine", SAE Transactions, vol. 63, pp. 107-131, 1955.
(Continued)

*Primary Examiner* — Lindsay M Low
*Assistant Examiner* — Omar Morales
(74) *Attorney, Agent, or Firm* — Knobbe, Martens, Olson & Bear, LLP

(57) ABSTRACT

A piston for an opposed-piston, internal combustion engine includes a crown with an end surface shaped to form a combustion chamber with an end surface of an opposing piston in the opposed-piston engine, a skirt part including a piston sidewall extending from the crown to an open end of the skirt part, a wristpin bore with first and second openings through the sidewall, a wristpin disposed in the wristpin bore, and at least two caps received in the first and second openings of the wristpin bore for sealing the wristpin bore and retaining the wristpin against axial movement.

18 Claims, 7 Drawing Sheets

Related U.S. Application Data application No. 14/596,855, filed on Jan. 14, 2015, now Pat. No. 9,759,119.

(60) Provisional application No. 62/478,958, filed on Mar. 30, 2017.

(51) Int. Cl.
| | | |
|---|---|---|
| *F01B 7/14* | (2006.01) | |
| *F02B 23/06* | (2006.01) | |
| *F02B 75/28* | (2006.01) | |
| *F16J 1/00* | (2006.01) | |
| *F16J 1/18* | (2006.01) | |
| *F01P 3/08* | (2006.01) | |
| *F02F 3/22* | (2006.01) | |

(52) U.S. Cl.
CPC ............... *F02B 75/28* (2013.01); *F16J 1/00* (2013.01); *F16J 1/18* (2013.01); F01P 3/08 (2013.01); F02F 3/22 (2013.01); Y02T 10/12 (2013.01)

(58) Field of Classification Search
USPC ...................................................... 123/41.35
See application file for complete search history.

(56) References Cited

U.S. PATENT DOCUMENTS

| | | | | |
|---|---|---|---|---|
| 5,072,654 | A * | 12/1991 | MacGregor | ........... F02F 3/0069 74/579 E |
| 5,724,933 | A | 3/1998 | Silvonen et al. | |
| 6,019,071 | A | 2/2000 | Maciejka, Jr. | |
| 6,048,126 | A * | 4/2000 | Kemnitz | ..................... F16J 1/18 92/219 |
| 6,120,189 | A | 9/2000 | Beagle et al. | |
| 6,364,565 | B1 * | 4/2002 | Billimack | .................. F16J 1/18 403/150 |
| 6,491,013 | B1 | 12/2002 | Gaiser et al. | |
| 8,136,502 | B2 | 3/2012 | Gildemeister et al. | |
| 8,430,070 | B2 | 4/2013 | Rebello | |
| 8,601,996 | B2 | 12/2013 | Miller et al. | |
| 8,776,670 | B2 | 7/2014 | Lapp et al. | |
| 8,800,528 | B2 | 8/2014 | Fuqua et al. | |
| 8,863,718 | B2 | 10/2014 | Rebello et al. | |
| 9,038,593 | B1 | 5/2015 | Kessler et al. | |
| 9,163,505 | B2 | 10/2015 | Dion et al. | |
| 9,169,800 | B2 | 10/2015 | Matsuo | |
| 9,175,725 | B2 | 11/2015 | Dion et al. | |
| 9,470,136 | B2 | 10/2016 | Mackenzie | |
| 9,482,145 | B2 | 11/2016 | Hofbauer et al. | |
| 9,759,119 | B2 | 9/2017 | Mackenzie et al. | |
| 2003/0075137 | A1 * | 4/2003 | Gaiser | ........................ F16J 1/08 123/193.6 |
| 2007/0028863 | A1 | 2/2007 | Fiedler | |
| 2010/0107868 | A1 | 5/2010 | Scharp et al. | |
| 2010/0212638 | A1 | 8/2010 | Rado | |
| 2010/0258064 | A1 | 10/2010 | Rebello | |
| 2011/0041684 | A1 | 2/2011 | Kortas et al. | |
| 2011/0132333 | A1 * | 6/2011 | Proenca | ................ F02B 75/042 123/51 R |
| 2012/0073526 | A1 | 3/2012 | Dion et al. | |
| 2013/0098316 | A1 | 4/2013 | Stan et al. | |
| 2013/0213342 | A1 | 8/2013 | Burton et al. | |
| 2014/0014063 | A1 | 1/2014 | Redon | |
| 2014/0083396 | A1 | 3/2014 | Burton et al. | |
| 2014/0238360 | A1 * | 8/2014 | Dion | .......................... F16J 1/16 123/51 B |
| 2015/0122227 | A1 | 5/2015 | Abani et al. | |
| 2015/0159583 | A1 * | 6/2015 | Pisila | .......................... F16J 1/18 123/193.6 |
| 2015/0252715 | A1 | 9/2015 | MacKenzie | |
| 2016/0290224 | A1 | 10/2016 | Abani et al. | |
| 2017/0030262 | A1 | 2/2017 | Venugopal et al. | |
| 2017/0370273 | A1 | 12/2017 | Mackenzie | |

FOREIGN PATENT DOCUMENTS

| | | | |
|---|---|---|---|
| FR | 2839116 | A1 | 10/2003 |
| GB | 420140 | A * | 11/1934 |
| GB | 916696 | A | 1/1963 |
| GB | 2431218 | A | 4/2007 |
| JP | 6-49745 | | 7/1994 |
| JP | 2011-117459 | | 6/2011 |
| JP | 2013-539516 | | 10/2013 |
| WO | WO 2012/023970 | | 2/2012 |
| WO | WO-2012/023970 | A2 | 2/2012 |
| WO | WO-2016/114968 | A1 | 2/2012 |
| WO | WO-2012/158756 | A1 | 11/2012 |

OTHER PUBLICATIONS

International Search Report for PCT/US2011/001429, mailed Mar. 12, 2012.
International Preliminary Report on Patentability for PCT/US2011/001429, mailed Feb. 28, 2013.
International Search Report for PCT/US2016/012431, mailed Apr. 19, 2016. Non-Final Office Action dated Sep. 15, 2017, for U.S. Appl. No. 15/647,880.
Non-Final Office Action dated Jul. 7, 2017, for U.S. Appl. No. 15/647,880.
Notice of Allowance dated Jul. 7, 2017, for U.S. Appl. No. 14/596,855.
Non-Final Office Action dated Oct. 26, 2017, for U.S. Appl. No. 15/687,368.
Notification of Reasons for Refusal dated Aug. 27, 2019, for Japanese Patent Application No. 2017-537263.
Notice of Allowance dated May 7, 2018, for U.S. Appl. No. 15/647,880.
Final Office Action mailed Mar. 30, 2018 for U.S. Appl. No. 15/687,368.
English translation of the Second Office Action dated Sep. 9, 2019, issued by the State Intellectual Property Office of PRC, for Chinese Patent Application No. 2016800050703.

\* cited by examiner

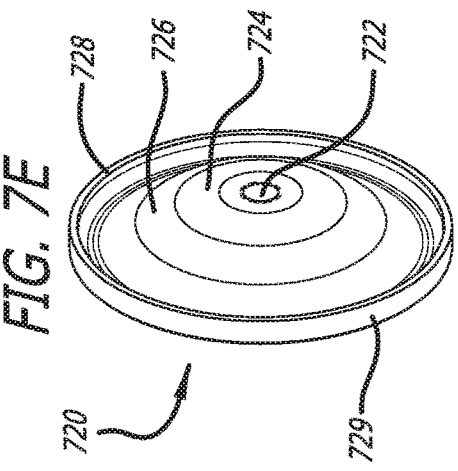
FIG. 7E
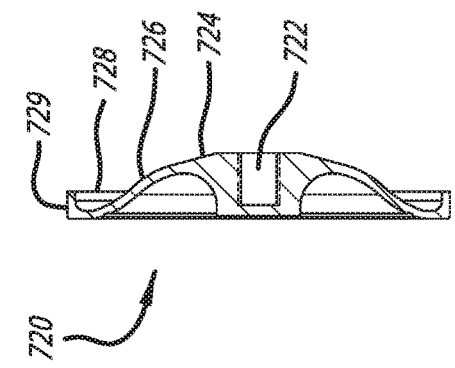
FIG. 7F
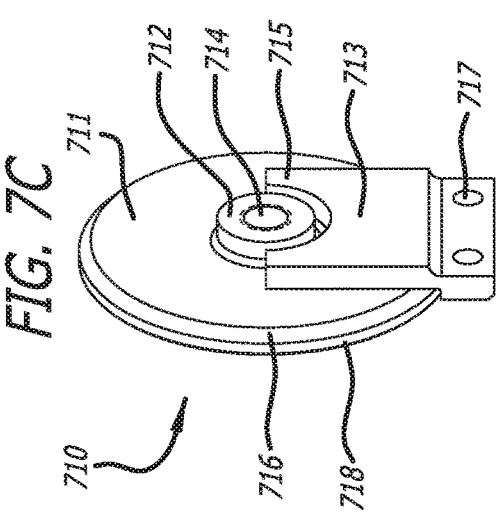
FIG. 7C
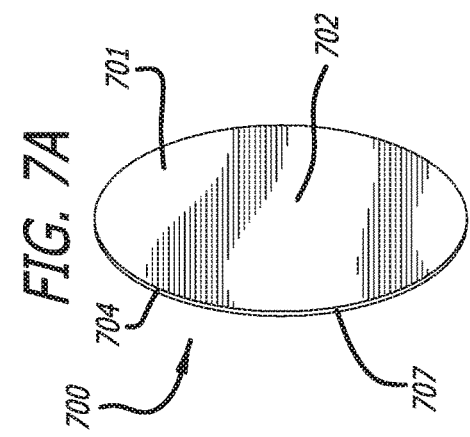
FIG. 7A
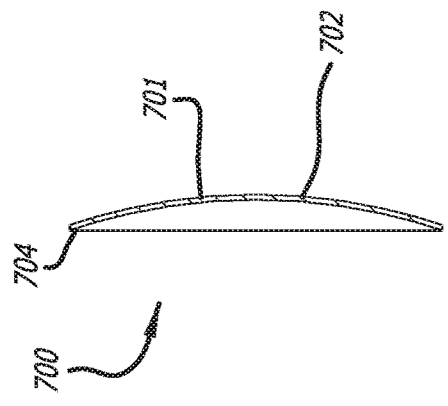
FIG. 7D
FIG. 7B

PISTON BEARING ASSEMBLY FOR AN OPPOSED-PISTON ENGINE

RELATED APPLICATIONS

This application claims priority to U.S. provisional application for patent No. 62/478,958, filed 30 Mar. 2017. This application also claims priority as a continuation-in-part of U.S. patent application Ser. No. 15/687,368, filed 25 Aug. 2017, which is a continuation of U.S. patent application Ser. No. 14/596,855, filed 14 Jan. 2015, now U.S. Pat. No. 9,759,119.

This application contains subject matter related to the subject matter of the U.S. patent application Ser. No. 15/647,880, filed Jul. 12, 2017, for "Piston Cooling for Opposed Piston Engines", published as US 2017/0306832 A1 on Oct. 26, 2017; U.S. patent application Ser. No. 13/136,955, filed Aug. 15, 2011, for "Piston Constructions for Opposed-Piston Engines," now U.S. Pat. No. 9,163,505, issued Oct. 20, 2015; U.S. patent application Ser. No. 13/776,656, filed Feb. 25, 2013, for "Rocking Journal Bearings for Two-Stroke Cycle Engines," now U.S. Pat. No. 9,175,725, issued on Nov. 3, 2015; U.S. patent application Ser. No. 14/075,926, filed Nov. 8, 2013, for "Lubricating Configuration For Maintaining Wristpin Oil Pressure In A Two-Stroke Cycle, Opposed-Piston Engine," now U.S. Pat. No. 9,038,593, issued on May 26, 2015; and U.S. patent application Ser. No. 14/199,877, filed Mar. 6, 2014, for "Piston Cooling Configurations Utilizing Lubricating Oil From a Bearing Reservoir in an Opposed-Piston Engine," now U.S. Pat. No. 9,470,136, issued on Oct. 18, 2016.

FIELD

The field is opposed-piston internal combustion engines. More specifically this application relates to a piston bearing assembly for an opposed-piston engine.

BACKGROUND

Pistons for opposed-piston engines are constructed differently from pistons that form combustion chambers against a cylinder head. This is true particularly for two-stroke opposed-piston engines in which the pistons move together in a ported cylinder to form a combustion chamber, and in which the movements of the pistons control the opening and closing of the cylinder ports in order to allow charge air to flow into and exhaust to flow out of the engine's cylinders. As is described in greater detail in some of the related applications listed above, features of these pistons allow for improved combustion and durability.

Known linkage assemblies for some of these pistons include a wristpin carrier that allowed for the interaction of a connecting rod, wristpin, and the piston in an environment in which the wristpin underwent continuous compressive loading throughout the entire operational cycle of the engine. For example, US publication 2015/0252715 describes and illustrates a bearing assembly in an opposed-piston engine wherein a biaxial wristpin/bearing interface induces periodic separation of axially distributed bearing segments so as to permit lubricant to reach the opposing external surfaces of the wristpin and the bearing. The lubricant is provided from an oil reservoir contained in the wristpin that is replenished continuously from an oil delivery passageway in a connecting rod on the small end of which the wristpin is fixed. The wristpin is a hollow cylindrical piece and the oil reservoir is formed by plugging the open ends of the wristpin. The bearing is supported in a generally rectangular structure that is installed in the interior of the piston, where it is completely enclosed in the piston skirt.

Because this prior art linkage assembly is separate from the cylinder skirt, the outer surface of the skirt is free of bosses and wristpin bores and so it presents a continuous cylindrical aspect to the cylinder bore, thereby providing a highly effective seal between the combustion chamber and crankcase when outfitted with nothing more than piston rings. However, the price paid is a complex and costly piston design which necessitates multiple assembly steps and adds weight to the piston. Further, although the continuous cylindrical aspect of the skirt enables an effective seal between the combustion chamber and the crankcase, it also results in generation of a significant amount of friction between the skirt and the cylinder bore.

A simpler, lighter piston for an opposed-piston engine eliminates the internal bearing support structure. Skirt/cylinder bore friction is reduced by provision of opposing longitudinal recesses in the skirt. The wristpin is supported by bosses defined, and bores formed, in the piston skirt. The bosses are defined by the longitudinal indentations and the wristpin bores are formed through the bosses. However, this configuration presents several challenges, including axial movement of the wristpin in the bearing and breach of the seal between the combustion chamber and the crankcase by the wristpin bores.

SUMMARY

An object is to provide a new and improved bearing assembly for a piston of an opposed-piston engine that uses a bore formed through the piston sidewall to support the bearing journal, that is to say, the wristpin, while maintaining a seal between combustion chamber and crankcase.

Another object is to provide a new and improved bearing assembly for a piston of an opposed-piston engine that uses a bore formed through the piston sidewall to support the wristpin, while preventing axial movement of the wristpin.

The bearing assembly includes a wristpin bore with a first opening formed in a first boss in the sidewall and a second opening formed in a second boss in the sidewall, in which the openings are coaxially aligned along a common axis. The wristpin includes ends received in the first and second openings for supporting the wristpin in the wristpin bore. According to one feature of the bearing assembly, provision is made for sealing the first and second openings by means that are seated in the openings.

According to another feature of the bearing assembly, the means that are seated in the openings contact the wristpin ends so as to prevent axial movement of the wristpin.

Altogether, these features relate to an opposed-piston engine with a pair of pistons disposed for forming a combustion chamber in a ported cylinder of the engine, in which a pair of opposing wristpin bore openings formed in a skirt of each piston support the ends of a wristpin disposed within the skirt, and means are receivable in the wristpin bore openings for sealing the wristpin bore and securing the wristpin against axial movement in the wristpin bore.

BRIEF DESCRIPTION OF THE DRAWINGS

FIG. 6A shows the piston with the wristpin bore empty; FIG. 6B shows the piston section with a wristpin installed in a wristpin bore.

FIGS. 7A-7F show various exemplary configurations for sealing and retaining discs according to this specification.

DETAILED DESCRIPTION

The piston bearing assembly embodiments described and illustrated herein are improvements and modifications of piston designs for opposed-piston engines. These embodiments include integration of functions and features of a wristpin carrier into other parts of the piston body, which simplifies piston construction and assembly.

A two-stroke cycle engine is an internal combustion engine that completes an operating cycle with a single complete rotation of a crankshaft and two strokes of a piston connected to the crankshaft. One example of a two-stroke cycle engine is an opposed-piston engine in which two pistons are disposed in opposition in the bore of a cylinder. During engine operation, combustion takes place in a combustion chamber formed in the bore between the end surfaces of the two pistons when the pistons move through respective top center locations in the bore. When used herein, the term "combustion chamber" refers to the minimum volume within the cylinder that is bounded by the end surfaces of the pistons and the annular portion of the bore between the end surfaces during operation of the engine during each cycle of engine operation.

Figure 1:
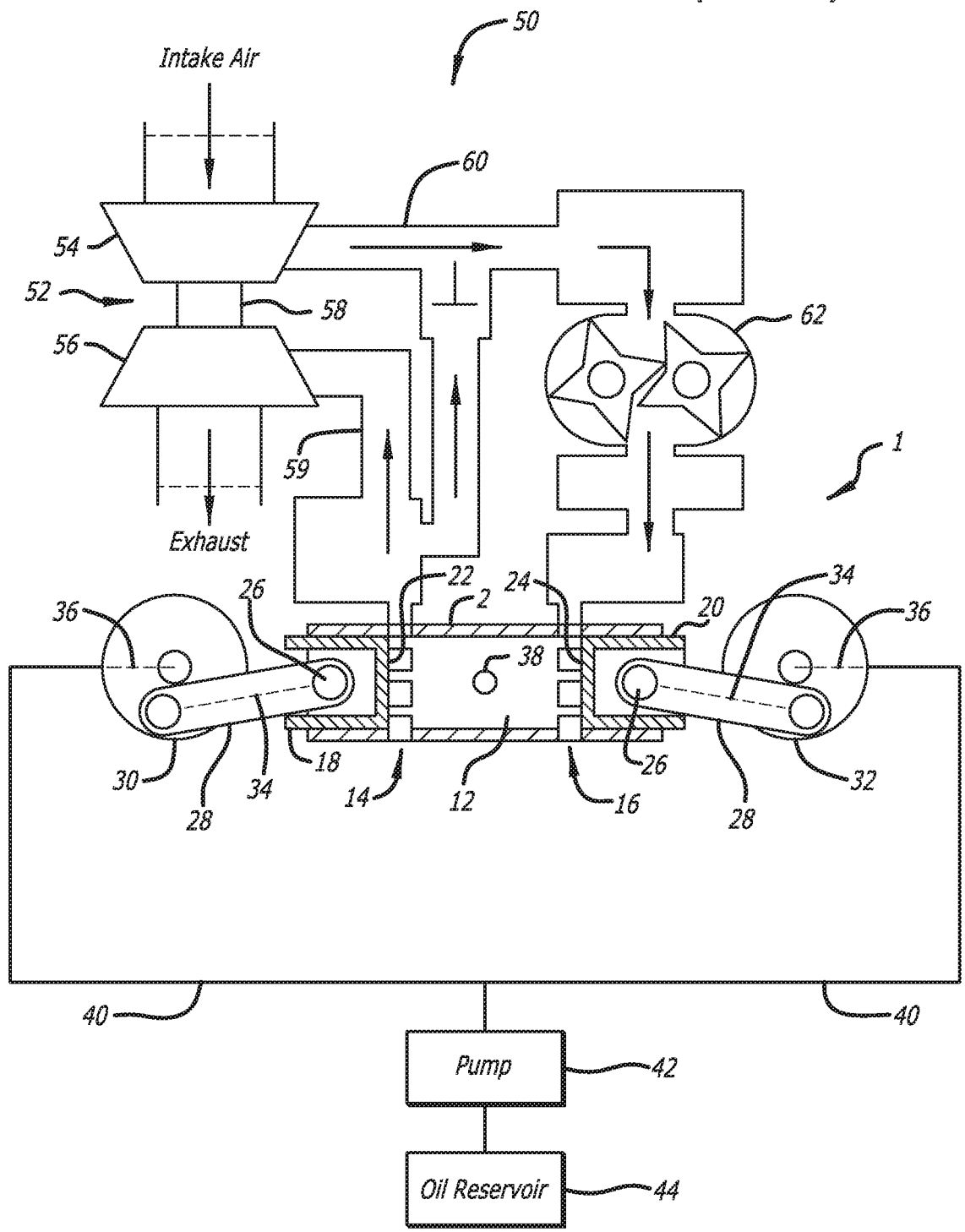
FIG. 1 shows a schematic drawing showing a prior art opposed-piston engine.

As seen in FIG. 1, an opposed-piston engine 1 has at least one ported cylinder 2. For example, the engine may have one ported cylinder, two ported cylinders, three ported cylinders, or four or more ported cylinders. For purposes of illustration, the engine 1 is presumed to have a plurality of ported cylinders. Each cylinder 2 has a bore 12. Exhaust and intake ports 14 and 16 are formed in respective ends of the cylinder such that the exhaust port 14 is longitudinally separated from the intake port 16. Each of the exhaust and intake ports 14 and 16 includes one or more circumferential arrays of openings. Exhaust and intake pistons 18 and 20 are slidably disposed in the bore 12 with their end surfaces 22 and 24 opposing one another. The exhaust pistons 18 are coupled to a crankshaft 30, and the intake pistons 20 are coupled to a crankshaft 32. Each of the pistons is coupled to its associated crankshaft by a bearing assembly 26 and a connecting rod 28. For this disclosure, a cylinder may comprise a boring or a formed space in an engine block, or a liner (or sleeve) retained in a tunnel in an engine block.

In the engine shown in FIG. 1, a lubrication system that supplies oil to lubricate moving parts of the engine 1 includes an oil reservoir 44 from which pressurized oil is pumped by a pump 42 to a main gallery 40. The main gallery 40 supplies pressurized oil to the crankshafts 30 and 32, typically through drillings 36 to the main bearings (not seen). From grooves and/or passageways in the main bearings, pressurized oil is provided to grooves in the big end bearings of the connecting rods 28. From there, pressurized oil flows through passageways 34 in the connecting rods to the bearings 26. In some aspects, which are not intended to be limiting, the engine 1 is equipped with an air management system 50 that may include either or both of a supercharger 62 and a turbocharger 52.

The operational cycle of an opposed-piston engine is well understood. In response to combustion occurring between their end surfaces 22, 24, the opposed pistons 18, 20 move away from respective top center (TC) locations in the cylinder. While moving from TC, the pistons keep their associated ports closed until they approach respective bottom center (BC) positions. The pistons may move in phase so that the exhaust and intake ports 14, 16 open and close in unison; alternatively, one piston may lead the other in phase, in which case the intake and exhaust ports have different opening and closing times. As the pistons move through their BC locations exhaust products flowing out of the exhaust port 14 are replaced by charge air flowing into the cylinder through the intake port 16. After reaching BC, the pistons reverse direction and the ports are again closed by the pistons. While the pistons continue moving toward TC, the charge air in the cylinder 2 is compressed between the end surfaces 22 and 24. Each end surface is shaped for forming a combustion chamber with the adjacent end surface of the opposing piston. See, for example, the piston end surface constructions described and illustrated in U.S. Pat. No. 8,800,528, US publication 2013/0213342, WO publication 2012/158756, US publication 2014/0014063, US publication 2015/0122227, US publication 2016/0290224, and US publication 2017/0030262. As the pistons advance to their respective TC locations in the cylinder bore, fuel is injected through the nozzles 38 into the charge air, and the mixture of charge air and fuel is compressed in the combustion chamber formed between the end surfaces 22 and 24 of the pistons 18 and 20. When the mixture reaches an ignition temperature, the fuel ignites. Combustion results, driving the pistons apart, toward their respective BC locations.

Figure 2:
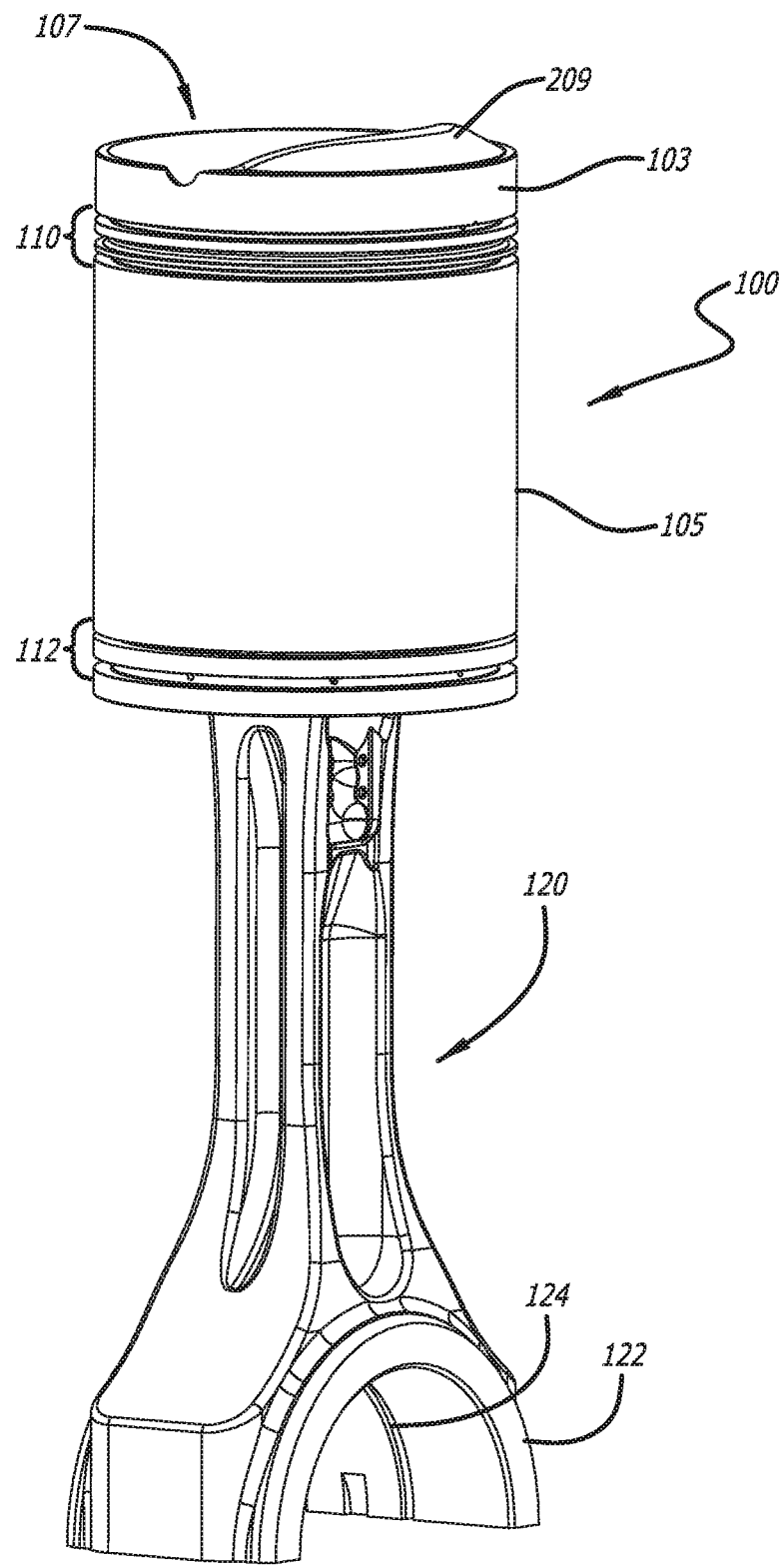
FIG. 2 is a side view, in perspective, of a prior art piston/connecting rod assembly for a two-stroke cycle, opposed-piston engine.

FIG. 2 is a perspective view of a prior art piston assembly used in an opposed-piston engine. The piston 100 has a crown 103, and a skirt with a sidewall 105. An end surface 107 of the crown is configured to form a combustion chamber in cooperation with the end surface of an opposing piston. Lands and compression ring grooves 110 are provided in side surface of the crown. Lands and oil control ring grooves 112 are provided in the skirt's side wall. The connecting rod 120 has a large end 122 for coupling to a crank throw of a crankshaft (not seen). An oil groove 124 is formed in the bearing surface of the large end 122. An oil delivery passage (not seen) extends longitudinally in the connecting rod 120 from the oil groove 124 to the small end of the connecting rod (shown as 126 in FIG. 3).

Figure 3:
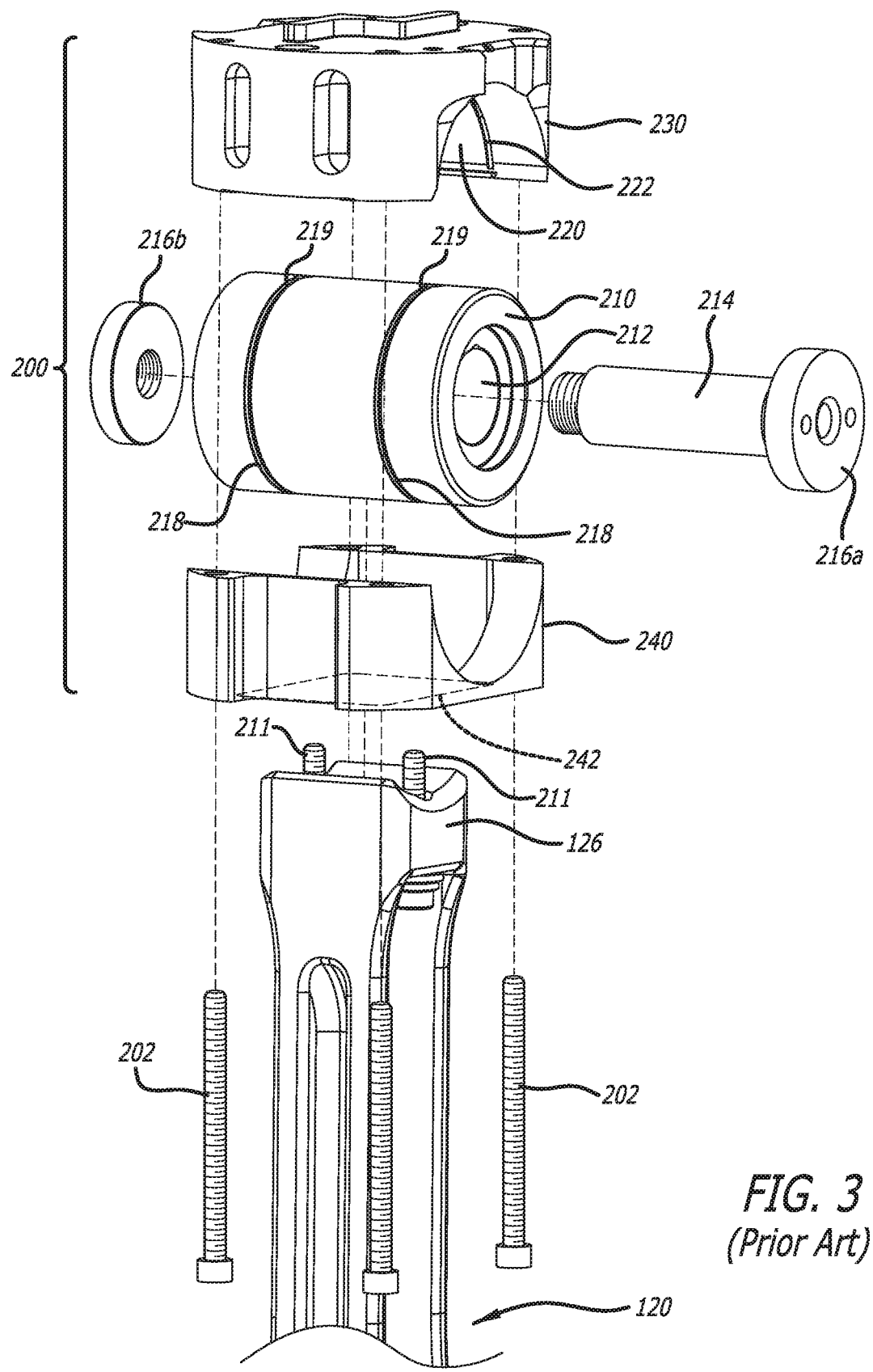
FIG. 3 is an exploded view of a prior art bearing support structure of the piston shown in FIG. 2.

With reference to FIGS. 2 and 3, the piston 100 includes a bearing 200 fixed to the crown undersurface and disposed in space encircled by the skirt 105. As shown in FIG. 3, a bearing structure includes an upper bearing support member 230 and a lower bearing support member 240. The upper bearing support member 230 includes a bearing surface 220 that receives a wristpin 210 (also called a "journal" or a "gudgeon pin") mounted to the small end 126 of the connecting rod 120 by threaded fasteners 211. In some instances, the bearing support members 230 and 240 are joined around the wristpin 210 and secured to the crown undersurface by fasteners 202 that are threadably seated in interior structures of the crown undersurface. As seen in FIG. 3, an opening 242 in the lower bearing support member 240 receives the connecting rod 120. When assembled, the bearing support member 230, 240 retains the wristpin 210 for oscillation on a bearing surface 220 caused by arcuate oscillation of the connecting rod 120 in the opening 242. The upper and lower bearing support members can also be collectively referred to as a wristpin carrier.

As per FIG. 3, the wristpin 210 includes an internal oil reservoir in fluid communication with an oil inlet passage drilled through the wristpin 210 and one or more oil outlet passages 219 drilled through the wristpin 210. Circumferential oiling grooves 222 are formed in the bearing surface 220 in alignment and fluid communication with the oil outlet passages 219. In some aspects, as seen in FIG. 3, the oil reservoir can be configured as an annular recess with opposing ends and an axis that corresponds to the axis on which the wristpin 210 oscillates. In this case, a cylindrical shaft 214 is received in the cylindrical inner surface 212 of the wristpin 210. A flange 216a is fixed to one end of the shaft 214; the opposite end of the shaft is threaded to another flange 216b, so as to retain the shaft 214 in coaxial alignment with the cylindrical inner surface 212 of the wristpin 210. As FIG. 3 shows, the smaller diameter of the shaft 214 results in the formation of an annular space between itself and the inner surface 212. In other instances the oil reservoir may be formed by a capped or stoppered drilling in the wristpin 210.

To facilitate cooling of the piston and lubrication of the wristpin shown in FIGS. 2 and 3, pressurized oil is transported to the large end oil groove in the manner illustrated by the transport path 44, 42, 40, 36 in FIG. 1. From the oil groove 124 in the large end of the connecting rod 120, pressurized oil is delivered to the oil reservoir adjacent to the wristpin via an oil reservoir inlet passage in the body of the connecting rod 120. Pressurized oil received in the oil reservoir is provided in multiple streams through the outlet passages 219 in the wristpin 210 to the oiling grooves 222. The pressurized oil then flows to lubricate the bearing interface between the bearing surface 220 and the wristpin 210.

In some aspects, the bearing 200 may be constructed as a rocking journal bearing (also called a "biaxial" bearing). Such a bearing is described in commonly-owned U.S. Pat. No. 9,175,725. In this case the bearing surface 220 comprises a plurality of axially-spaced, eccentrically-disposed surface segments and the wristpin 210 includes a corresponding plurality of axially-spaced, eccentrically-disposed wristpin segments. In such cases, the bearing surface 220 may have a semi-cylindrical configuration with two lateral surface segments sharing a first centerline and a central surface segment separating the two lateral surface segments and having a second centerline offset from the first centerline. In such cases, the circumferential oiling grooves 222 are formed in the bearing surface 220 at the borders between the central surface segment and the lateral surface segments. In some instances, the outer surface of the wristpin 210 may have axially-spaced circumferential grooves 218 and one or more circumferentially-spaced axial oiling grooves (not seen) may also be formed in the bearing surface 220 to enhance the lubrication of the bearing interface.

Figure 4:
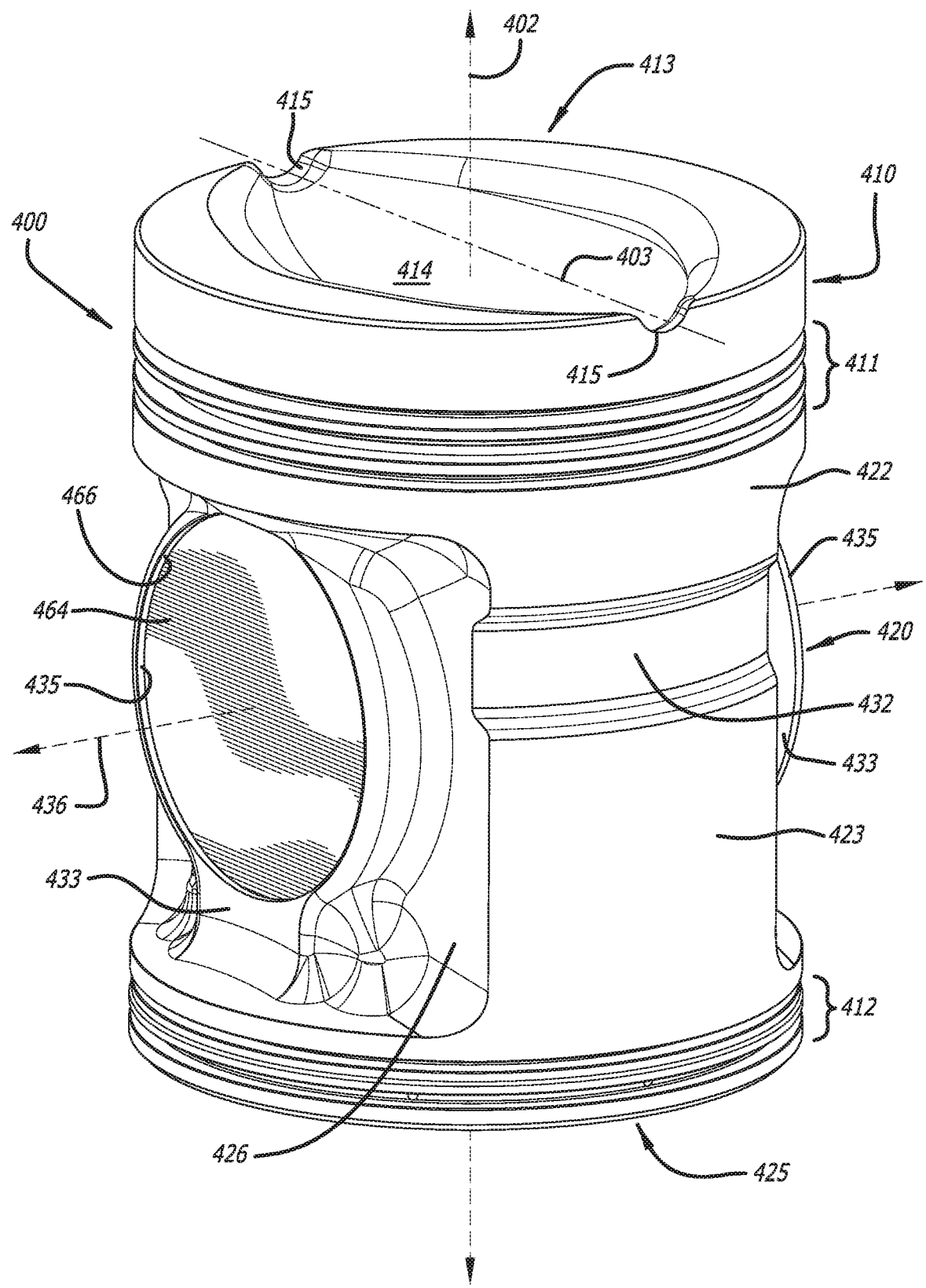
FIG. 4 is an isometric view of a piston constructed for use in an opposed-piston engine according to this specification.

Piston Bearing Assembly For An Opposed-Piston Engine. FIG. 4 illustrates an example of a piston 400 for an opposed-piston engine. The piston 400 provides a lower mass and reduced friction, compared with the piston shown in FIG. 1. These reductions are accompanied by replacement of the bearing support construction of FIG. 3 with a simpler bearing assembly designed to seal a combustion chamber in an opposed-piston engine and to stabilize the bearing wristpin against axial movement. The piston 400 has a longitudinal axis 402, a crown 410 with a first set of ring grooves 411 formed therein, and a skirt 420 with a piston sidewall 422.

The crown 410 has an end surface 413 shaped to form a combustion chamber with an adjacent end surface of an opposing piston in an opposed-piston engine. The end surface 413 includes a bowl 414 that defines part of the combustion chamber. The bowl 414 has notches 415 at the periphery of the end surface 413 to accommodate fuel injection (e.g., fuel injector nozzles, fuel sprays). The bowl 414 has a major axis 403 that has its midpoint along the piston's longitudinal axis 402. Preferably, there are two notches 415 aligned in opposition along the major axis 403. The shape of the end surface 413 shown in FIG. 4 limits the scope of this disclosure only to the extent that it cooperates with the end surface of an opposing piston to form a combustion chamber in an opposed-piston engine. Preferably the shape of the combustion chamber includes openings that are defined at least in part by the notches 415 through which fuel is injected. Many other such end surface shapes are possible; see, for example, the piston end surface constructions described and illustrated in U.S. Pat. No. 8,800,528, US publication 2013/0213342, WO publication 2012/158756, US publication 2014/0014063, US publication 2015/0122227, US publication 2016/0290224, and US publication 2017/0030262.

The piston sidewall 422 is generally cylindrical and extends along the longitudinal axis 402. A second set of ring grooves 412 is formed in a portion of the sidewall 422 near an open end 425 of the skirt (best seen in FIG. 6A). The sidewall 422 is formed with opposing sidewall portions 423 separated from one another by intervening sidewall indentations 426. For example, there are two opposing sidewall portions 423 and two opposing longitudinal indentations 426 in the sidewall. The sidewall portions 423 extend from the crown 410 toward the open end 425. Relative to the longitudinal axis 402, the sidewall portions 423 have the same radius as the crown 410 and the circumferential portion of the sidewall where the second set of ring grooves 412 is situated. The indentations 426 run longitudinally in the sidewall 422 between the first ring grooves 411 and the second ring grooves 412. An annular indentation 432 is formed in the piston sidewall 422. The indentations 426 and 432 minimize both the mass of the piston and contact area of the sidewall felt by the bore of a cylinder in which the piston is disposed. The indentations 426 define pin bosses 433 in which diametrically-opposed, laterally-spaced wristpin bore openings 435 are formed at respective ends of a wristpin bore. The wristpin bore openings 435 are coaxially aligned along a wristpin bore axis 436.

Figure 5:
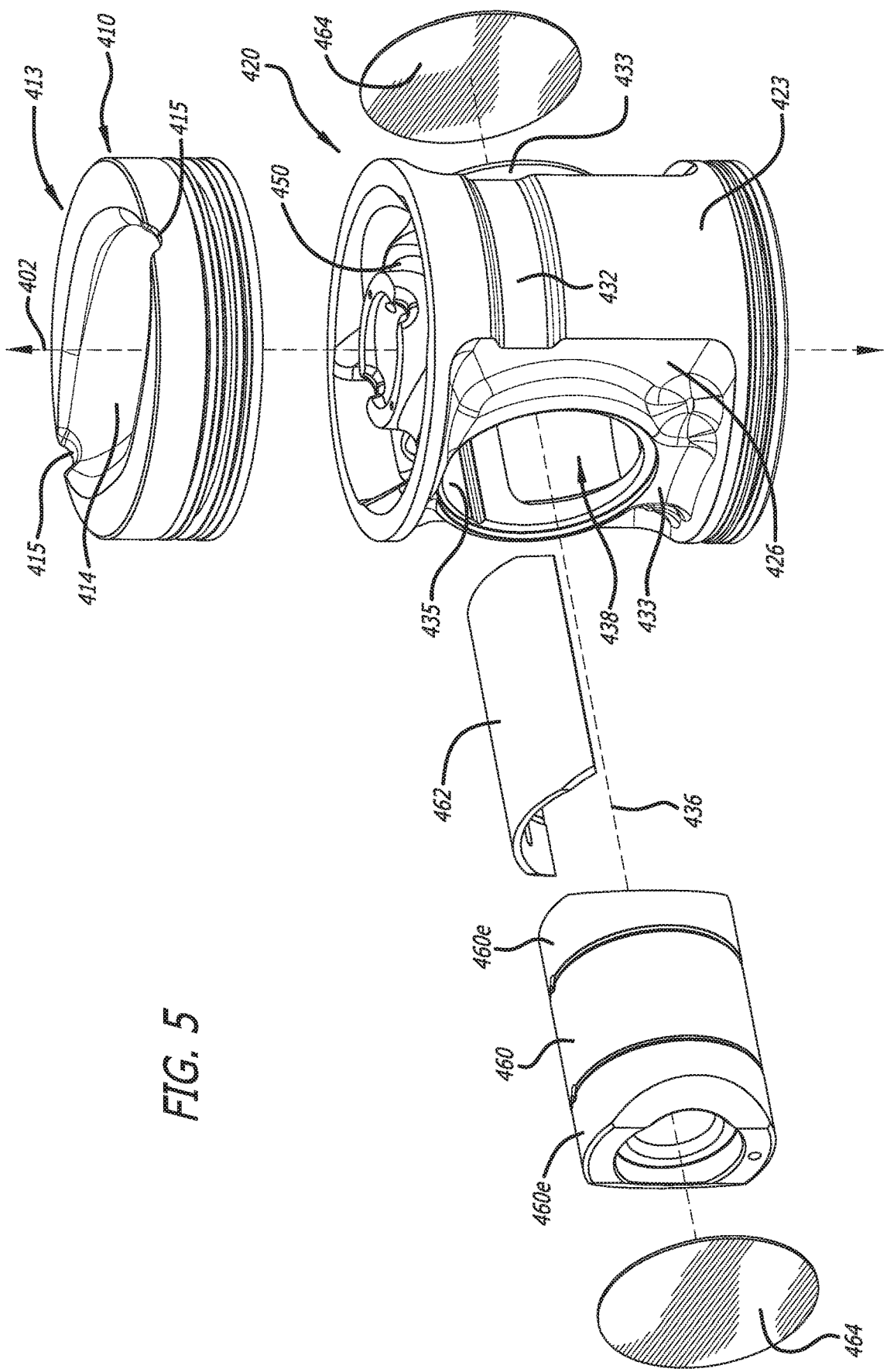
FIG. 5 is an exploded view of the piston of FIG. 4.
Figure 6C:
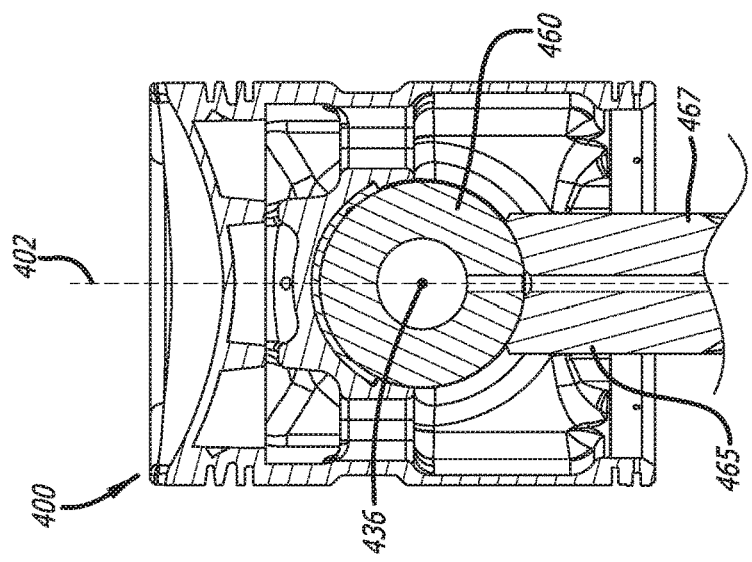
FIG. 6C is a side sectional view of the piston of FIG. 4 taken generally transversely to the wristpin bore axis of the piston with a wristpin installed in a wristpin bore.
Figure 6B:
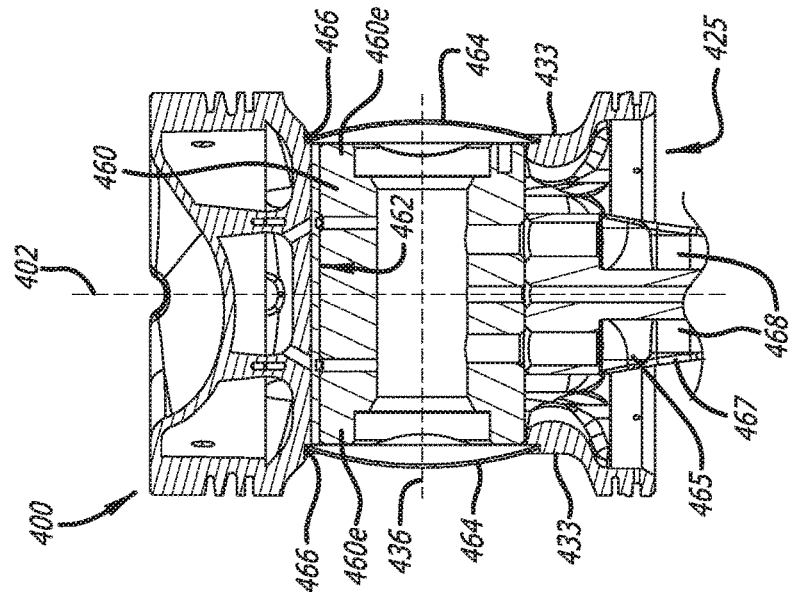
FIGS. 6A and 6B are side sectional views of the piston of FIG. 4 taken along a wristpin bore axis of the piston.
Figure 6A:
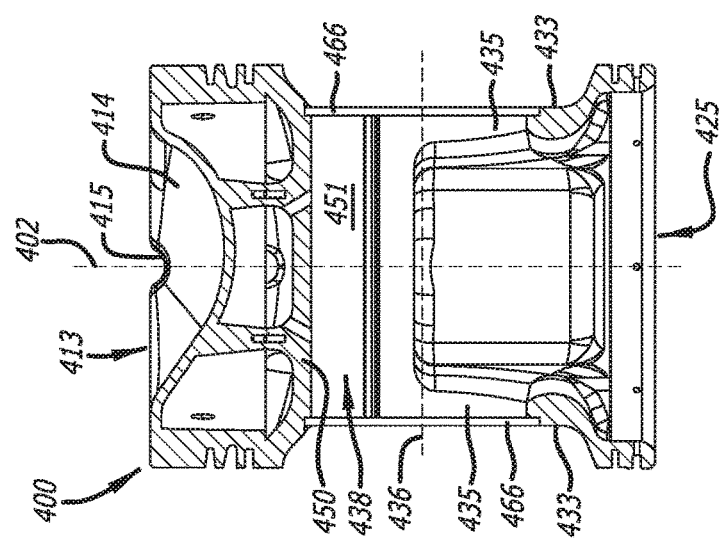

FIG. 5 is an exploded view of the piston 400 showing components that form a wristpin bore 438 when assembled in the interior of the piston. FIGS. 6A and 6B are cross-sectional views of the piston 400 shown in FIG. 4 taken along the wristpin bore axis 436. FIG. 6A shows the wristpin bore 438 without the wristpin. FIG. 6B shows the wristpin bore with the wristpin installed therein. FIG. 6C is a cross-sectional view of the piston 400 shown in FIG. 4 taken generally transversely to the wristpin bore axis 436 with the wristpin installed in the wristpin bore. Although a particular bore construction is shown in these figures, this is intended only as an example and is not to be considered as limiting broader principles of sealing and retention that are to be described in detail.

With reference to FIGS. 5, 6A, and 6B, an interior wall 450 that closes an upper end of the skirt 420 includes structures that support a bearing journal (hereinafter, "wristpin"). One side 451 of the interior wall 450 defines a portion of the wristpin bore 438 where a wristpin 460 is received and retained. The side 451 extends between the wristpin bore openings 435. In the example shown, a bearing sleeve 462 is received and seated in a recessed portion of the side 451. Together, the sleeve 462 and the wristpin bore openings 435 define the wristpin bore 438 of this example.

FIGS. 6B and 6C show the piston 400 with the wristpin 460 installed in the wristpin bore 438. The wristpin 460 has two ends 460e that are received and supported in the wristpin bore openings 435. The wristpin 460 has a journal surface that rotates against an opposing surface of the bearing sleeve 462 and the two ends 460e. As shown in FIGS. 6B and 6C, the wristpin 460 is attached to the small end 465 of a connecting rod 467 by threaded fasteners 468, which configures the piston for installation in an opposed-piston engine in the manner shown in FIG. 1.

As shown in FIGS. 5 and 6A, each boss 433 comprises a shallow annular pin relief groove 466 that is concentric with, and abuts, the wristpin bore opening 435 formed in the boss. A cap 464 is secured in an annular axial space immediately adjacent a wristpin bore opening 435 at each end of the wristpin bore that is afforded by a pin relief surface 466. The caps perform two important functions. First, they seal the wristpin openings. Without the caps, the unsealed wristpin openings would permit the loss of gases to the crankcases, thereby degrading the combustion chamber seal. Furthermore, if left unsealed, the wristpin openings provide passages for the transport of oil from the interior of the piston skirt into the cylinder, which increases undesirable emissions. The second function performed by the caps is retention of the wristpin, in which regard the caps when seated resist side-to-side shift or movement of the wristpin along the wristpin axis. Together, the caps control axial motion of the wristpin. An unexpected benefit may be realized in eliminating connecting rod manufacturing steps directed to reduction of end play.

As shown in FIG. 5, each cap 464 comprises a disc-shaped member with a circular periphery having a diameter slightly larger than that of the annular axial space in which it is received. With reference to FIG. 6B, presuming that a cap 464 is formed from spring steel and pressed into place with a dome-shaped tool (not shown), each cap 464 assumes a spherical shape with a convex outer side facing away from the wristpin bore 438. Around the peripheries of a concave inner side, each of the caps also abuts a respective end 460e of the wristpin with a very small clearance, if any. In other instances, the spherical shape may be pre-formed, and the cap inserted as shown in FIG. 6B, to be retained by frictional contact with the pin relief surface and, at the same time, constrained by the cylinder bore surface.

FIGS. 7A-7F show various exemplary cap constructions for use with a piston bearing assembly according to this specification. Each cap construction serves to seal the interior of the piston. In addition to sealing the piston body, the caps can guide or control axial motion of the wristpin. This guidance or motion control of the wristpin may also reduce, restrict, or suppress end play of a connecting rod attached to the wristpin.

FIG. 7A shows a cap 700 comprising a disc-shaped body portion 701 that includes an external surface on a side 702 that orients outside the wristpin bore of a piston (e.g., 464 in FIGS. 4 and 5). A peripheral edge 707 of the body portion 701 may comprise a groove 704. With a groove, the cap 700 may further comprise an O-ring (not shown) fitted into the groove 704 when the cap 700 is seated in the piston, at one end of the wristpin bore. FIG. 7B is a cross-sectional view of the cap 700 shown in FIG. 7A. In some implementations, during use, the cap 700 is maintained in its position by forces exerted by the O-ring and/or contact of the retaining disc 700 with a portion of the cylinder bore surface as the piston moves in the bore. In other instances, the cap 700 may be press fit into an annular axial space defined by a pin relief groove 466 as shown in FIGS. 6A and 6B. Preferably, the cap 700 is of such a diameter as to render a distinct spherical dome when installed in a wristpin bore opening 435, as shown in FIGS. 6A and 7B. However, design considerations may require that the cap 700 undergo little or no bending and thus present a substantially flat aspect when installed.

FIG. 7C shows a disc-shaped cap 710 with a side 711, a raised portion 712, an opening 714, a peripheral chamfer 716, and a peripheral contacting surface 718, as well as a radially-extending, rectangular flange 713 with a cylindrical recess 715 and fastening openings 717. The side 711 orients outside the wristpin bore when the cap 710 is installed in the bearing assembly. The raised portion 712 and opening 714 allow fitting of the cap 710 to an end of the wristpin bore, with the raised portion 712 received in the cylindrical recess 715 of the flange 713 when the cap 710 is in place. The flange 713 can be shaped to receive the cap, so that the peripheral contacting surface 718 is flush with the inner surface of the wristpin bore when fasteners are inserted through the fastening openings 717 so as to attach the flange 713, for example, to the boss. FIG. 7D is a cross-sectional view of the cap 710 and flange 713 of FIG. 7C. The flange 713 may or may not be present in implementations in which a cap 710 is press-fit into an annular axial space defined by a pin relief groove 466 as shown in FIGS. 6A and 6B.

FIG. 7E shows a disc-shaped cap 720 including a central opening 722 in the middle of a rising portion 724 on a convex external surface 726. The cap 720 also has an annular radial flange 728 with a contacting surface 729. The external surface 726 is surrounded by the annular radial flange 728. The cap 720 can deform when put in use, and while in use, so that the contacting surface 729, when received in an annular axial space defined by a pin relief groove 466 as shown in FIGS. 6A and 6B, effectively closes off the wristpin bore opening to the area external to the piston. Deformation can occur primarily in the rising portion 724 of the external surface 726. The opening 722 may have a threaded interior wall to receive a tool for inserting the retaining cap 720 and allowing for deformation at a precise location in the cap 720 as it is inserted. The ability to control where deforming force is applied to the cap 720 can prevent the use of force that can harmfully deform either or both of the piston and the cap. A cross-sectional view of the cap 720 is shown in FIG. 7F.

The materials and methods of construction of the piston 400 may be conventional for medium and/or heavy duty use or for large bore applications. For example, the crown and skirt part may be formed separately of compatible and/or complementary materials (e.g., forged steel crown, cast iron skirt part) and joined by welding or brazing. Additionally, or alternatively, forming technology including printing technology can be used to form some or all of the piston 400 and its components. Materials can include laminated structures, hybrid structures, composite structures, and the like, including thermal barrier coatings, ceramic-metal composites (e.g., cermets), high-temperature metal alloys, and laser ablated/structured surfaces.

Those skilled in the art will appreciate that the specific embodiments set forth in this specification are merely illustrative and that various modifications are possible and may be made therein without departing from the scope of the subject piston bearing assembly for an opposed-piston engine.

The invention claimed is:

1. A piston for an opposed-piston engine, comprising:
a crown with an end surface that includes means for forming an opposed-piston engine combustion chamber with an adjacent end surface of an opposing piston;
a skirt including a sidewall extending from the crown to an open end of the skirt;
a wristpin bore with first and second openings through the sidewall, in which the first opening is formed in a first pin boss in a first longitudinal recess of the sidewall and the second opening is formed in a second pin boss in a second longitudinal recess of the sidewall, the openings being coaxially aligned along a common axis;
a wristpin including ends received in the first and second openings for supporting the wristpin in the wristpin bore; and,
means for sealing the first and second openings through the sidewall and retaining the wristpin against axial motion in the wristpin bore.

2. The piston of claim 1, in which the means for sealing and retaining comprise caps in the first and second openings.

3. The piston of claim 2, in which the caps comprise disc-shaped devices seated in the first and second openings.

4. The piston of claim 3, in which the disc-shaped devices comprise one of O-rings and flanges.

5. The piston of claim 3, in which the disc-shaped devices are seated in the first and second openings by at least one of a press-fit and deformation of a center portion of each disc-shaped device.

6. The piston of claim 3, in which the wristpin is secured to the small end of a connecting rod.

7. A piston for an opposed-piston engine, comprising a crown with end surface means for forming a combustion chamber with an end surface of another piston in a cylinder of the opposed-piston engine, a skirt comprising a sidewall extending from the crown, a wristpin with opposing ends, means for supporting the wristpin with the ends disposed in opposing openings formed in the sidewall, a pair of caps with circular peripheries receivable in the openings, the caps being of such a shape as to seal the openings in the sidewall and to secure the wristpin axially.

8. The piston of claim 7, in which the caps comprise disc-shaped devices seated in the opposing openings.

9. The piston of claim 8, in which each cap comprises one of an O-ring and a flange.

10. The piston of claim 8, in which each of the caps comprises one of: a disc-shaped device with an opening, a peripheral chamfer, and a peripheral contacting surface seated in the opposing openings; and
a disc-shaped device with a central opening in the middle of a rising portion on a convex external surface.

11. The piston of any one of claims 9-10 in which the means for supporting the wristpin includes a wristpin bore with a first opening of the opposing openings formed in a first pin boss in a first longitudinal recess of the sidewall and a second opening of the opposing openings formed in a second pin boss in a second longitudinal recess of the sidewall, the openings being coaxially aligned along a common axis.

12. The piston of claim 7, in which the means for supporting the wristpin includes a wristpin bore with a first opening of the opposing openings formed in a first pin boss in a first longitudinal recess of the sidewall and a second opening of the opposing openings formed in a second pin boss in a second longitudinal recess of the sidewall, the openings being coaxially aligned along a common axis.

13. An opposed-piston engine comprising a pair of pistons disposed for forming a combustion chamber in a ported cylinder of the engine, in which each piston comprises a pair of opposing wristpin bore openings formed through a skirt of the piston and aligned coaxially on a bore axis, a wristpin with ends disposed in the wristpin bore openings, and means for sealing the wristpin bore openings and securing the wristpin against axial movement.

14. The opposed-piston engine of claim 13, each of the wristpins comprising a biaxial journal disposed for movement against a bearing sleeve.

15. The opposed-piston engine of claim 13, in which the means for sealing comprise disc-shaped caps seated in annular pin relief grooves abutting the opposing wristpin bore openings.

16. The opposed-piston engine of claim 15, in which each disc-shaped cap comprises a spherical shape when seated in one of the pair of opposing wristpin bore openings.

17. The opposed-piston engine of claim 15, in which each disc-shaped cap comprises one of an O-ring seated in a peripheral groove of the disc-shaped cap and an annular radial flange located on a peripheral edge of the disc-shaped cap for being received in an annular axial space defined by a pin relief groove abutting one of the pair of opposing wristpin bore openings.

18. The opposed-piston engine of any one of claims 15-17, each of the wristpins comprising a biaxial journal disposed for movement against a bearing sleeve.

* * * * *